(12) United States Patent
Gautschi et al.

(10) Patent No.: US 7,794,095 B2
(45) Date of Patent: Sep. 14, 2010

(54) SANITARY FITTING WITH A LIGHTGUIDE OUTFLOW PIPE

(75) Inventors: Christian Gautschi, Reinach (CH);
Stefan Brunner, Moosleerau (CH);
Michael Lehner, Graenichen (CH);
Daniel Baumann, Schmiedrued (CH)

(73) Assignee: KWC AG, Unterkulm (CH)

( * ) Notice: Subject to any disclaimer, the term of this patent is extended or adjusted under 35 U.S.C. 154(b) by 176 days.

(21) Appl. No.: 12/216,603

(22) Filed: Jul. 8, 2008

(65) Prior Publication Data

US 2008/0291660 A1    Nov. 27, 2008

Related U.S. Application Data

(63) Continuation-in-part of application No. 11/372,207, filed on Mar. 10, 2006, now Pat. No. 7,467,874.

(30) Foreign Application Priority Data

Mar. 11, 2005   (EP) ................... 05005389

(51) Int. Cl.
*F21V 33/00*   (2006.01)
(52) U.S. Cl. ....................... 362/96; 362/318
(58) Field of Classification Search ............... 362/96, 362/101, 318
See application file for complete search history.

(56) References Cited

U.S. PATENT DOCUMENTS

| | | | |
|---|---|---|---|
| 4,827,538 A | 5/1989 | Heimann et al. | |
| 5,123,437 A | 6/1992 | Egli et al. | |
| 5,171,429 A | 12/1992 | Yasuo | |
| 5,491,617 A | 2/1996 | Currie | |
| 5,937,892 A | 8/1999 | Meisner et al. | |
| 6,126,290 A * | 10/2000 | Veigel | 362/96 |
| 6,439,472 B1 | 8/2002 | Lin et al. | |
| 6,805,458 B2 | 10/2004 | Schindler et al. | |
| 2003/0168100 A1 | 9/2003 | Ericsson | |
| 2006/0152917 A1 | 7/2006 | Stuhlmacher, II et al. | |
| 2006/0255168 A1* | 11/2006 | Huang et al. | 362/96 |

FOREIGN PATENT DOCUMENTS

| | | |
|---|---|---|
| DE | 31 35 861 A1 | 3/1983 |
| DE | 3841 026 A1 | 6/1990 |
| DE | 41 11 928 A1 | 10/1991 |
| DE | 40 31 764 A1 | 2/1992 |

(Continued)

OTHER PUBLICATIONS

European Search Report for Application No. EP 09 00 2624; mailed Apr. 8, 2010.

*Primary Examiner*—David V Bruce
(74) *Attorney, Agent, or Firm*—Oliff & Berridge, PLC

(57) ABSTRACT

A sanitary fitting includes a light-permeable water-carrying outflow pipe that has (i) an exposed end face and (ii) an input face located upstream of the exposed end face. A light source, preferably including light emitting diodes (LED), inputs light into the outflow pipe through the input face. The light emerges from the outflow pipe at the end face, and may also emerge at an exposed outer peripheral surface area of the outflow pipe. The outflow pipe has a stationary first outflow pipe piece with the input face and a rotatable second outflow pipe piece with the exposed end face.

16 Claims, 8 Drawing Sheets

FOREIGN PATENT DOCUMENTS

| | | |
|---|---|---|
| DE | 43 13 439 A 1 | 10/1994 |
| DE | 201 02 857 U 1 | 7/2001 |
| EP | 0 446 365 A1 | 9/1991 |
| JP | A-54-159075 | 12/1979 |
| WO | WO 94/24379 | 10/1994 |
| WO | WO 2004/092626 A1 | 10/2004 |

\* cited by examiner

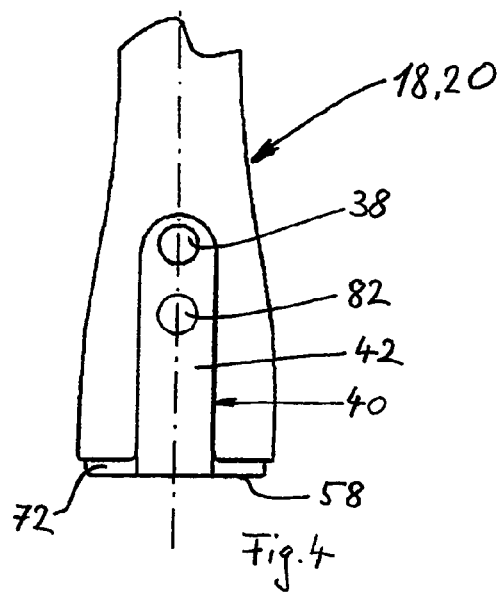
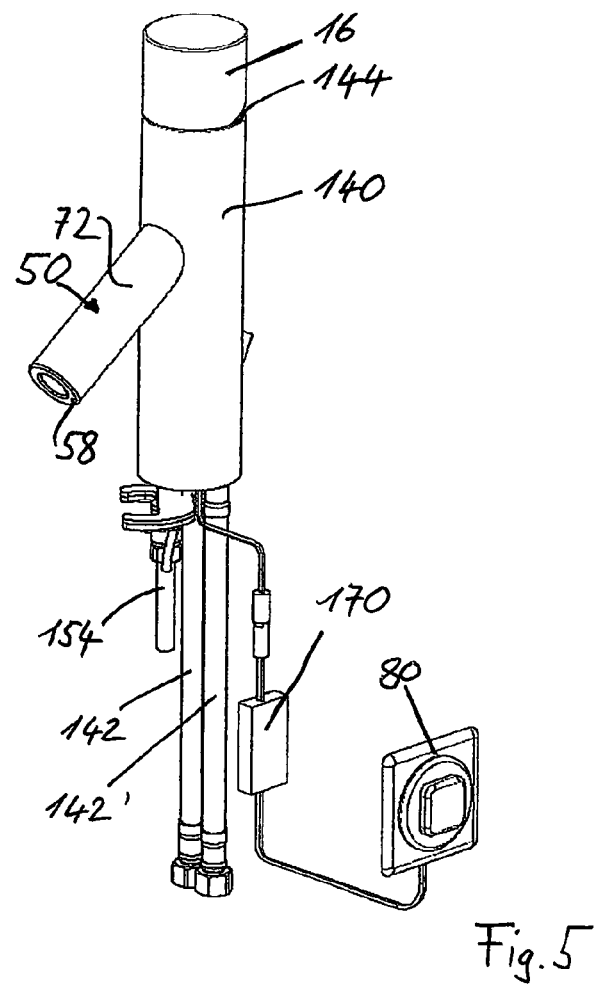

SANITARY FITTING WITH A LIGHTGUIDE OUTFLOW PIPE

This is a Continuation-in-Part of application Ser. No. 11/372,207 filed Mar. 10, 2006. The disclosure of the prior application is hereby incorporated by reference herein in its entirety.

BACKGROUND

The present invention relates to a sanitary fitting that includes a lightguide.

Sanitary fittings of this general type are known from EP-A-0 446 365 and DE-U-201 02 857.

EP-A-0 446 365 discloses a sanitary fitting with an outflow pipe manufactured from metal. The outflow pipe has an exposed end face at an end located downstream. Through the wall of the outflow pipe runs a lightguide element which has an output face lying in the end face. Light from a light source arranged in the sanitary fitting is output through the lightguide element at the output face in such a way that a water jet is illuminated from outside by the lightguide element.

In a further sanitary fitting, likewise disclosed in EP-A-0 446 365, which has an outflow pipe manufactured from metal, light from a light source is input into the water running out of the sanitary fitting. For this purpose, the sanitary fitting has a lightguide which is arranged in a wall of the outflow pipe and which terminates above the end face in the flow direction. An end division of the lightguide which faces away from the light source is oriented in the direction of the flow duct and is adjacent to the flow duct. The light is input into the outflowing water from the lightguide.

DE-U-201 02 857 discloses a water jet illuminator with a jet former which is fixedly connected to a conventional domestic water tap. The water flowing out of the domestic water tap is illuminated by a light emitting diode and a lightguide. One end of the lightguide bears against the light emitting diode and the other end of the lightguide is arranged within the outflowing water.

SUMMARY

An object of exemplary embodiments of the present invention is to provide a generic sanitary fitting which makes it possible to have a substantially simpler design.

This object may be achieved by a sanitary fitting that includes a light-permeable water-carrying outflow pipe and a light source. The outflow pipe has (i) an exposed end face and (ii) an input face located upstream of the exposed end face. Light from the light source is input into the outflow pipe at the input face, and emerges at the end face.

According to exemplary embodiments of the invention, the water-carrying outflow pipe is manufactured from a light-permeable—transparent or translucent—material, and light is input into the outflow pipe at an input face lying upstream. The outflow pipe has an exposed end face which is located downstream and at which the light is output from the outflow pipe.

Visual effects can be achieved by the partial exposure of the outer surface area of the outflow pipe.

According to a preferred embodiment, the sanitary fitting according to the invention has an extendable hose capable of being extended out of a guide pipe and having a water outflow head attached to the end of the extendable hose and having an outflow pipe. It is thereby possible to bring the water outflow head and therefore also the light source into an advantageous position for cleaning an article.

A sanitary fitting according to exemplary embodiments of the invention has the further advantage that the surroundings of the outflowing water and/or even the outflowing water itself can be illuminated, depending on the form of the end face. By the surroundings of the outflowing water being illuminated, it is possible to ensure that an article to be cleaned is illuminated optimally even when the surrounding lighting is poor.

Further particular advantages and types of action may be gathered from the detailed description of the drawing.

BRIEF DESCRIPTION OF THE DRAWINGS

Exemplary embodiments of the invention are explained in detail below with reference to the drawings in which, purely diagrammatically:

FIG. 4 shows a view, in the direction of the arrow III depicted in FIG. 1, of the widened end region with an inserted water outflow head according to FIGS. 1 and 2;

FIG. 5 shows a view of a second exemplary embodiment of a sanitary fitting according to the invention with an exposed outflow pipe projecting from the housing of the sanitary fitting;

DETAILED DESCRIPTION OF EMBODIMENTS

Figure 1:
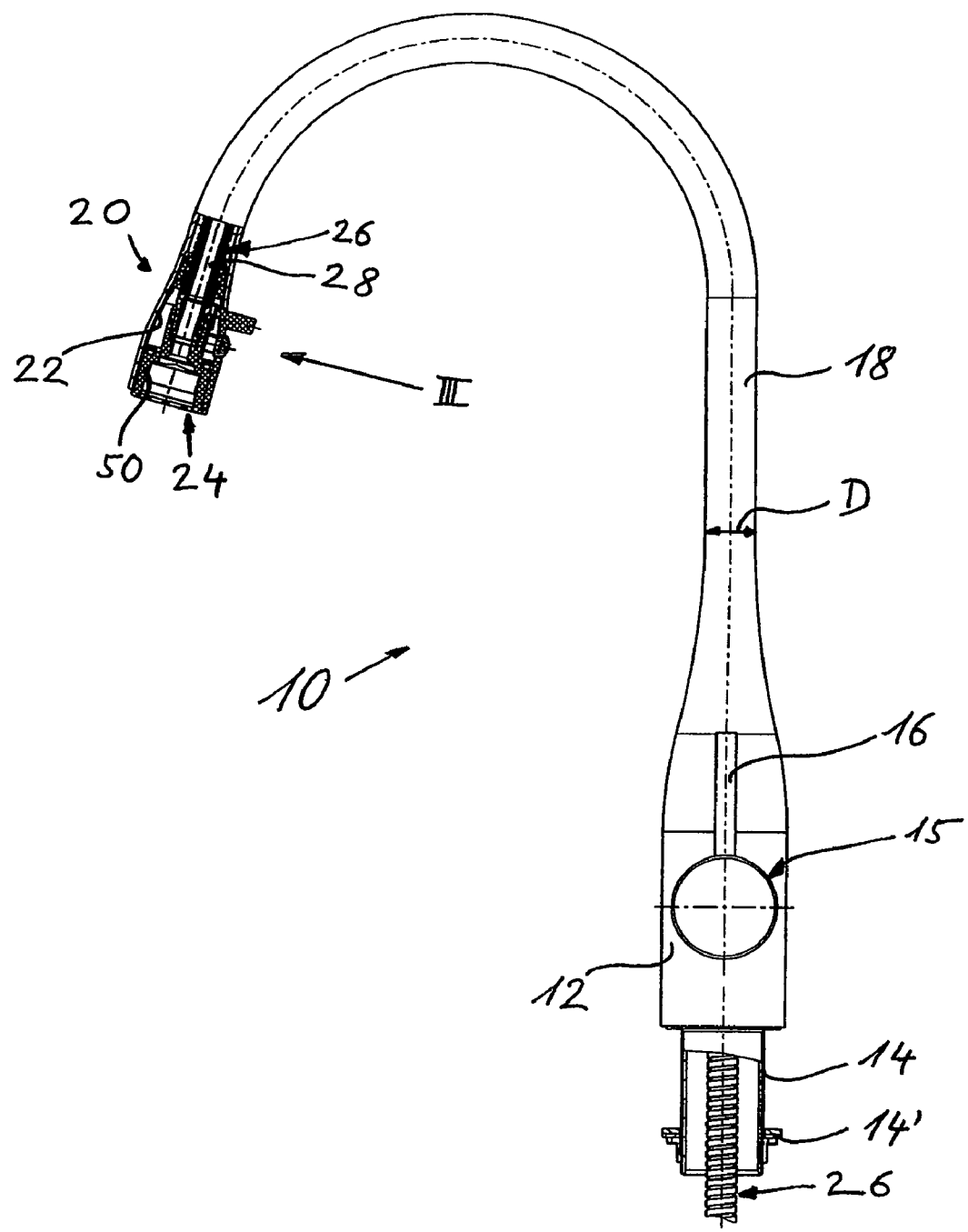
FIG. 1 shows a partially sectional view of a first exemplary embodiment of a sanitary fitting according to the invention with a water outflow head arranged in a widened end region of a guide pipe and having a lightguide outflow pipe.
Figure 2:
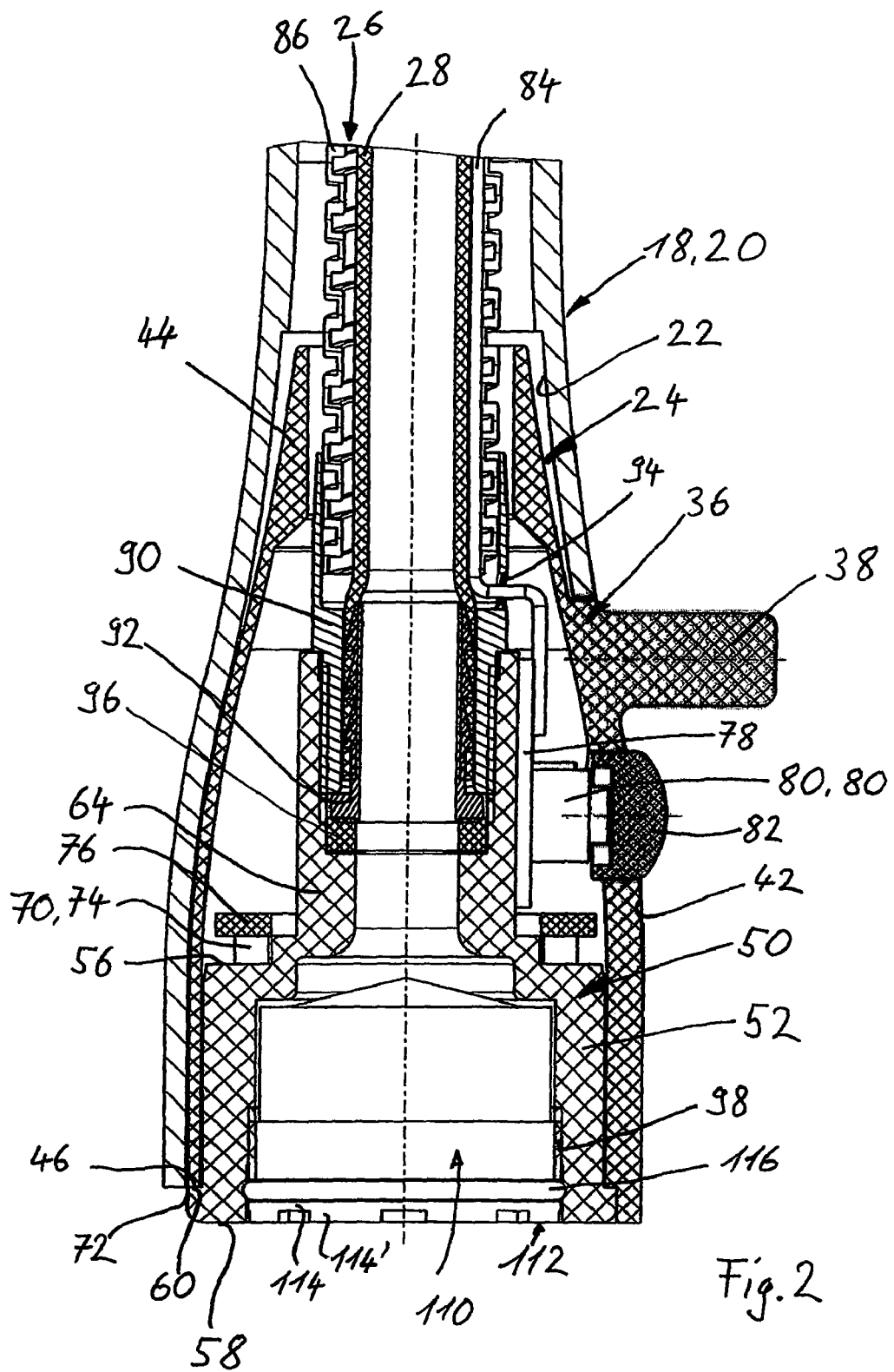
FIG. 2 shows, enlarged in relation to FIG. 1, a section through the water outflow head arranged in the widened end region and having an extendable hose.

A first exemplary embodiment of a sanitary fitting 10 according to the invention is shown in FIGS. 1, 2 and 4.

As shown in FIG. 1, the sanitary fitting 10 has a fitting housing 12, from which a mounting connection piece 14 projects downward. The latter is intended for fastening the sanitary fitting 10 to a mounting surface, not shown, of a washing table by a nut 14'. The fitting housing 12 has a recess with a mixer cartridge 15 inserted in a known way and having an actuation element 16 for controlling the water flow. A guide pipe 18, which may be pivotable about a vertical axis, projects from the fitting housing 12 in the vertical direction. The guide pipe 18 may narrow from the fitting housing 12 in the manner of a bell to a diameter D, and may run initially rectilinearly and then virtually in a semicircular arc. A free end region 20 of the guide pipe 18 may widen continuously in the manner of the bell. The interior of the free end region 20 may form a receptacle 22 for a water outflow head 24 that can be pulled out and reinserted.

The water outflow head 24 may be fixedly connected to an extendable hose 26 running through the interior of the guide pipe 18, the interior of fitting housing 12 and the interior of the mounting connection piece 14. The extendable hose 26, as is generally known, runs back to the fitting housing 12 in a loop. The extendable hose 26 may have (see FIG. 2) an external casing hose 86 and a water hose 28 arranged inside the casing hose 86. Between the casing hose 86 and the water hose 28 is arranged an electrical line 84, preferably a multiwire cord. The water hose 28 is intended for carrying mixed water from the mixer cartridge 15 to the water outflow head 24. Moreover, the mixer cartridge 15 is connected in a known way to a cold and hot water feed line, not shown.

As shown in FIGS. 1, 2 and 4, a housing 36 of the water outflow head 24 has a bell-like shape which is adapted to the shape of the receptacle 22. In order to allow simple handling, the housing 36 has a tenon-like pull-out aid 38 which projects in a radial direction. For this purpose, the free end region 20 of the guide pipe 18 has (see FIG. 4) a guide slot 40 which is open at the end of the guide pipe 18 and through which the pull-out aid 38 is guided when the water outflow head 24 is being moved in and moved out. The housing 36 has, further, a bead 42 which, if the water outflow head 24 is inserted into the receptacle 22, engages into the guide slot 40. Apart from in the region of the bead 42 and in an end region 44 located upstream, the housing 36 has a thin-walled design with substantially constant wall thickness. At the end located downstream, apart from in the region of the bead 42, the housing 36 has a peripheral housing end face 46. The bead 42 may project beyond the housing end face 46 in the flow direction.

The water outflow head 24 has a water-carrying, preferably rotationally symmetric, light-permeable lightguide outflow pipe 50 connected to the water hose 28. The outflow pipe 50 is manufactured, for example, from acrylic glass or from another transparent or translucent material. The outflow pipe 50 has a hollow-cylindrical light transmission region 52 in a portion located downstream. This light transmission region 52 is delimited, on the one hand, upstream, by an input face 56 and, on the other hand, downstream, by an exposed end face 58. The end face 58 lies opposite the input face 56 in the outflow direction, and both the end face 58 and the input face 56 may lie at right angles to the longitudinal axis of the outflow pipe 50.

The outflow pipe 50 may have, spaced apart from the end face 58, a radially outer shoulder 60 which is oriented upstream and which bears against the housing end face 46. Between the shoulder 60 and the end face 58, the outflow pipe 50 may have an exposed outer surface area 72, the exposed outer surface area 72 merging continuously into an outer surface of the housing 36. The exposed outer surface area 72 may be exposed even with the water outflow head 24 inserted into the receptacle 22.

Adjacently to the light transmission region 52, the outflow pipe 50 has a connecting region 64 in the manner of a connection piece. The outflow pipe 50 may narrow in a steplike manner in the transitional region from the light transmission region 52 to the connecting region 64.

An inside diameter of the outflow pipe narrows in, for example, two steps from the larger inside diameter of the light transmission region 52 to the smaller inside diameter of the connecting region 64. The inside diameter is selected such that a jet controller 110, described further below, can be inserted into the outflow pipe 50.

A light source 70 is arranged, preferably so as to bear directly against the input face 56 of the outflow pipe 50. The light from the light source 70 which is input at the input face 56 is transmitted by the light transmission region 52 to the end face 58, and is at least partially output from the outflow pipe 50 at the end face 58. Moreover, light may also be output from the outflow pipe 50 in the region of the exposed outer surface area 72 between the shoulder 60 and the end face 58, apart from in the region of the bead 42.

One or more, and preferably a plurality of, light emitting diodes (LED) 74 (nine in this example) are used as light source 70. The diodes 74 are preferably arranged at regular intervals in the circumferential direction, with a light cone axis of each diode 74 running at least approximately at right angles through the input face 56 and parallel to the axis of rotation of the outflow pipe 50. What is achieved by such an orientation of the light cone axes is that as large a fraction as possible of the light emitted by the diodes 74 emerges through the end face 58 and through the outer surface area 72. In addition to or instead of white light, the light source 70 may also emit colored light.

The diodes 74 may be arranged on an annular circuit board 76 which surrounds the outflow pipe 50 in the connecting region 64. On a further circuit board 78 connected electrically to the annular circuit board 76, a control circuit for the light source 70, with a switching element 80, is arranged. The further circuit board 78 is fastened to the connecting region 64 of the outflow pipe 50 and above the annular circuit board 76 in the flow direction. The switching element 80 may be a key 80' with a key head 82. The key head 82 may pierce the bead 42 of the housing 36 in a leaktight manner below the pull-out aid 38 in the flow direction. By the key 80', depending on the configuration of the switch electronics on the further circuit board 78, the light source 70 can be activated. It is conceivable that the key 80' switches on the light source 70 in the event of a first actuation and switches it off again in the event of a further actuation, in which case the switch-off may take place with a time delay. A further possibility is that the light source 70 is switched off after a certain period of time by a timer.

The supply of electrical energy to the electrical circuit and the light source 70 is ensured via the electrical line 84 which is connected electrically to a power supply. The power supply is preferably mounted in a specific box below the washing table and is designed to be used in a wet area. A power pack is used as energy source for the power supply, although batteries or accumulators may also be used instead of the power pack.

In order to make a leaktight and at the same time fixed connection of the extendable hose 26 with water hose 28 and the water outflow head 24 with outflow pipe 50, the internal water hose 28 may project beyond the external casing hose 86. An end region of the extendable hose 26 may be surrounded completely by a sleeve 90. A clamping tenon 92 may be introduced into the water hose 28 from the free end, so that the water hose 18 is clamped firmly and sealingly between the clamping tenon 92 and the sleeve 90. The clamping tenon 92 has a flow duct, the diameter of which corresponds substantially to the diameter of the unstretched water hose 28. A length of the clamping tenon 92 is preferably selected such that the clamping tenon 92 can be introduced only into that region of the water hose 28 which projects beyond the casing hose 86, so that the clamping tenon 92 is spaced apart from the casing hose 86 in the flow direction. It is thereby possible to guide the electrical line 84, arranged between the casing hose 86 and the water hose 28, through a passage orifice 94 of the sleeve 90 to the further circuit board 78, without the electrical line 84 being clamped between the casing hose 86 and the clamping tenon 92.

The sleeve 90 may have an external thread and be screwed into the connection region 64 of the outflow pipe 50. In order to make a leaktight connection between the clamping tenon 92 and the outflow pipe 50, the clamping tenon 92 preferably has an annular face lying at right angles to the outflow direction, and the connecting region 64 preferably has a likewise annular contact face lying opposite the annular face of the tenon 92. A sealing ring 96 is preferably clamped between the annular face and the contact face. Adjacently to the contact face, the connecting region 64 is water-carrying and has an inside diameter which is substantially equal to the inside diameter of the clamping tenon 92.

The housing 36, in a region in which the extendable hose 26 enters the water outflow head 24 and in a region in which the housing 36 bears against the light transmission region 52 of the outflow pipe 50, may be adhesively bonded in a leaktight manner to the extendable hose 26 and to the outflow pipe 50 respectively, with the result that a connection of the housing 26 to the outflow pipe 50 and to the casing hose 86 respectively is made, and neither dirt nor moisture can penetrate into the interior of the water outflow head 24.

A jet controller 110 having an external thread 98 may be screwed into the outflow pipe 50 from the end lying downstream. The jet controller 110 preferably is of cylindrical design, has a form fitting into the outflow pipe, and is countersunk completely into the outflow pipe 50 in the flow direction. A crownlike plug-in region 112 lying downstream is formed by depressions 114 and elevations 114' spaced in the circumferential direction and oriented in the flow direction. An O-ring 116 for sealing off the jet controller 110 with respect to the outflow pipe 50 is arranged on the jet controller 110 between the external thread 98 and the plug-in region 112 in the flow direction. The jet controller 110 used may be a perlator of the company Neoperl.

The crownlike plug-in region 112 makes it possible for the jet controller 110 to be exchanged in a simple way for a new jet controller of the same type. To exchange the jet controller 110, the crownlike plug-in region of the new jet controller may be plugged onto, i.e., engaged with, the plug-in region 112 of the jet controller 110 installed in the outflow pipe 50. By the new jet controller, the jet controller 110 screwed into the outflow pipe 50 can be screwed out. The new jet controller is screwed in a similar way. On account of the crownlike plug-in region 112, a special tool is not needed for exchanging the jet controller 110.

The housing 36 may be manufactured from a plastic or a metal. The key head 82 of the key 80' may, as shown in FIG. 2, be guided sealingly through the housing 36 or be spanned by a diaphragm. The diaphragm may, for example, be injection-molded, by means of a generally known two-component injection molding method, onto the housing manufactured from plastic.

Figure 3:
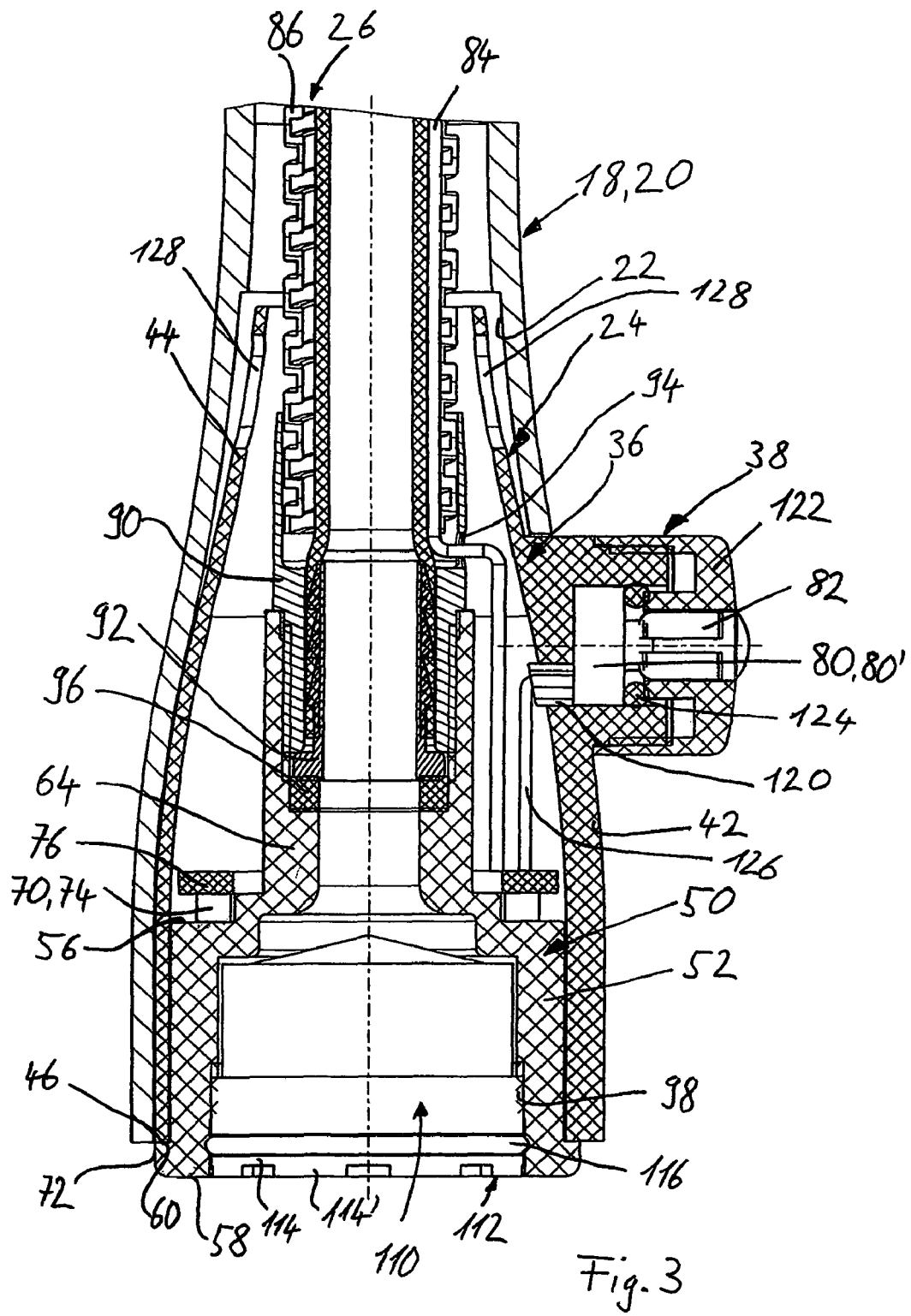
FIG. 3 shows a view of a further embodiment of a water outflow head for a sanitary fitting according to the invention, according to the first exemplary embodiment.

A further embodiment of a water outflow head is shown in FIG. 3, only differences from the water outflow head described above being dealt with below. The same reference symbols are used for corresponding elements.

In this embodiment, the switching element 80 is integrated into the pull-out aid 38. For this purpose, the pull-out aid 38 has an outwardly open recess which runs in an axial direction of the pull-out aid and into which the switching element 80 is inserted. A line duct 120 leads from a bottom of the recess into the interior of the water outflow head 24. The switching element 80, in the form of a key 80', may have a key head 82 which projects from the recess and which is completely surrounded in its circumferential direction by a protective cap 122. The protective cap 122 may be screwed onto the pull-out aid 38 and is preferably elastomeric. A sealing ring 124 bearing against the inner surface area of the recess may be arranged between the protective cap 122 and the switching element 80.

The electrical line 84 led through the extendable hose 24 is connected electrically to the circuit board 76 carrying the light source 70. The circuit board 76, which preferably is firmly clamped in a generally known way, also carries switch electronics. The switching element 80 may be connected to the circuit board 76 via an electrical switch line 126 led through the line duct 120.

The housing 36 of the water outflow head 24 is preferably of thin-walled design, apart from in the region of the bead 42. The bead engaging into the guide slot 40 may terminate in the longitudinal direction of the housing 36 at the same height as the housing 36, so that the bead 42 does not project beyond the housing end face 46. The outflow pipe 50 has a peripheral exposed outer surface area 72.

In the end region 44 located upstream, the housing 36 has a plurality of radial passages 128 arranged, preferably uniformly, in the circumferential direction. A cavity located in the radial direction between the outflow pipe 50 or the sleeve 90 and the housing 36 and in the longitudinal direction between the passages 128 and the input face 56 is filled with a filling compound, for example a two-component casting resin, which is introduced into the cavity through the passages.

In a modification of any of the above-described or below-described structures, the actuation element 16 of the mixer cartridge 15 may be operatively connected to a switching element arranged in the fitting housing 12, so that the light source is switched on when water flows out.

In another modification of any of the above-described or below-described structures, instead of the mixer cartridge with an actuation element for the manual regulation of the water throughflow through the sanitary fitting 10, an electronically controlled valve may be used. The valve may be connected to the electrical circuit in the water outflow head 24 via a control line of the multiwire electrical line 84. As a result of the actuation of the switching element 80, on the one hand, the light source 70 in the water outflow head 24 and, on the other hand, the electrically controlled valve, are activated.

In another modification of any of the above-described or below-described structures, the end face 58 does not lie at right angles to the outflow direction. The end face may lie at an angle to the outflow direction, may be a curved face or may have virtually any desired form, with the result that an incidence of light from the outflow pipe 50 can be influenced virtually as desired. The exposed outer surface area may likewise be varied in its optical properties, for example by the surface being roughened, with the result that the emerging light is scattered to a greater extent, or by the outer surface area being colored.

In another modification of any of the above-described or below-described structures, the circuit board 76 has a larger outside diameter, so that the circuit board 76 bears against the housing 36.

A second exemplary embodiment is described with reference to FIGS. 5 and 6.

As FIG. 5 shows, a hollow-cylindrical fitting housing 140 of circular cross section of a sanitary fitting 10 according to this embodiment of the invention is oriented vertically. The sanitary fitting 10 is intended to be fastened in a known way on a mounting surface of a washing table by a fastening spindle 154 projecting downward. Inside the fitting housing 140 is arranged a housing inner body 156 (see FIG. 6) which bears against the fitting housing 140 in a radial direction. Two connecting lines 142, 142' project downward from the housing inner body 156 and are intended for supplying hot and cold water to the sanitary fitting 10. A mixer cartridge 144 with an actuation element 16 arranged above the fitting housing 140 is inserted in a known way from above into the fitting housing 140.

A circular-cylindrical outflow pipe 50 is inserted into the fitting housing 140, so that the cylinder axis of the fitting housing 140 forms an angle of 55 degrees with the cylinder axis of the outflow pipe 50 and the outflow pipe 50 projects, inclined downward, from the fitting housing. The outside diameter of the outflow pipe 50 is preferably smaller than the outside diameter of the fitting housing 140.

The outflow pipe 50 is preferably manufactured from a light-permeable material, the material having transparent and/or translucent properties. For example, the outflow pipe 50 may be manufactured from glass or acrylic glass. The surface of the pipe is designed to be smooth, but may also be rough or roughened, with the result that optical properties of the outflow pipe 50 can be influenced.

Figure 6:
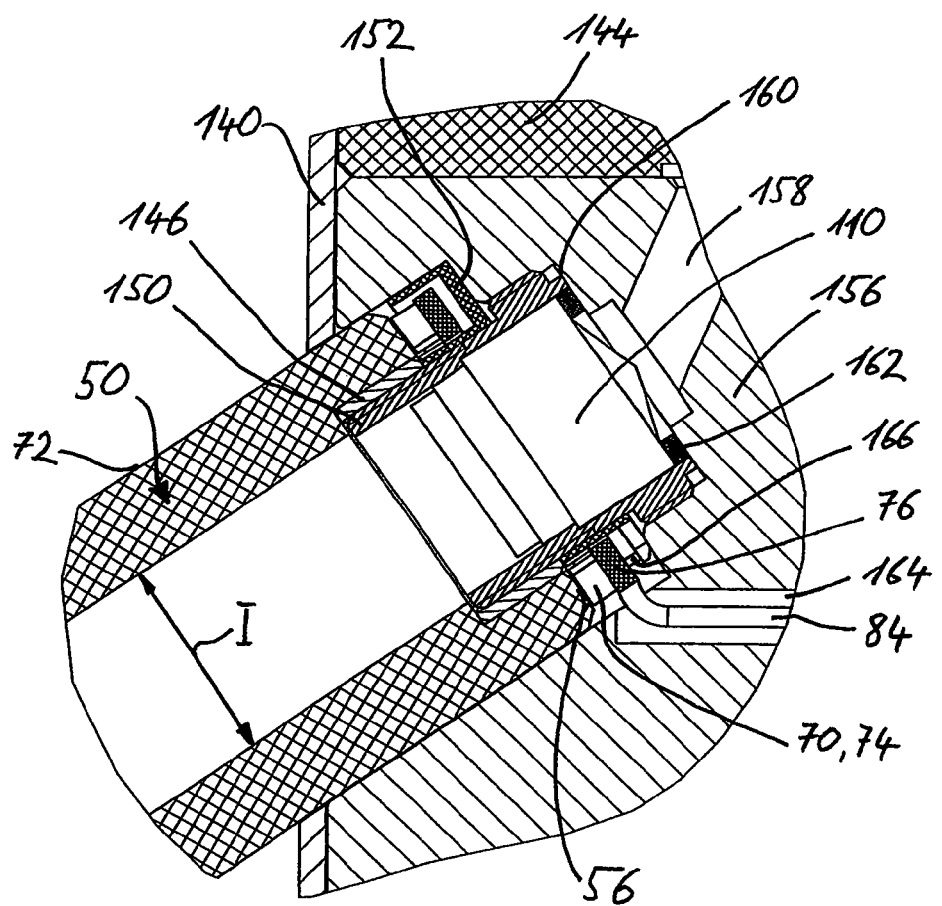
FIG. 6 shows, enlarged in relation to FIG. 5, a longitudinal section through part of the fitting housing with the lightguide outflow pipe inserted into the fitting housing.

As shown in FIGS. 5 and 6, the outflow pipe 50 has an end face 58 at an end located downstream and an input face 56, lying opposite the end face 58, at an end located upstream. An inside diameter I of the outflow pipe 50 is preferably constant, apart from in a mounting region which is adjacent to the input face 56 and which lies within the fitting housing 140. The mounting region preferably has a larger inside diameter than the inside diameter I. In the mounting region, a threaded sleeve 146 having an internal thread may be inserted, preferably glued, into the outflow pipe 50. Below the mounting region in the flow direction, the outflow pipe 50 is water-carrying. The threaded sleeve 146 preferably has screwed into it a threaded bush 150 which projects out of the outflow pipe 50 at the input face 56. The threaded bush 150 may be surrounded by a holding ring 152 which is in the form of a U-profile and the orifice of which is oriented in the direction of the input face 56 and in which an annular circuit board 76 is arranged. The annular circuit board 76 carries a light source 70, which may include a plurality of light emitting diodes (LED) 74, preferably manufactured as surface-mountable components (SMD). The diodes 74 preferably bear against the input face 56 of the outflow pipe 50 in such a way that the light cone axis of each diode 74 runs at right angles through the input face 56 and the end face 58 and parallel to the cylinder axis of the outflow pipe 50. The diodes 74 are preferably attached to the circuit board 76 at regular intervals in a circumferential direction. Instead of or in addition to the diodes 74, of course, light sources 70 of another design may be used.

Light introduced by the diodes 74 into the outflow pipe 50 is guided from the latter to the end face 58 and to a radially outer surface area 72, lying outside the fitting housing 140, of the outflow pipe 50 and is output from the latter at the end face 58 and also at the exposed surface area 72.

The threaded sleeve preferably has an external thread above the holding ring 152 in the flow direction.

The fitting housing 140 has a recess, through which the outflow pipe 50 is led. The housing inner body 156 may have a circular-cylindrical stepped blind hole for receiving the outflow pipe 50, the blind hole having, adjacently to the fitting housing 12, a larger inside diameter corresponding to the outside diameter of the outflow pipe 50 and, spaced apart from the fitting housing 12, a smaller inside diameter. The region of the blind hole having the larger inside diameter is designed in such a way that the outflow pipe 50 and the holding ring 152 can be inserted into this region. The blind hole may have, in the region of the smaller diameter, an internal thread into which the threaded bush 150 is screwed.

A mixed water duct 158 coming from the mixer cartridge 144 issues into a bottom region 160 of the blind hole and carries mixed water from the mixer cartridge 144 to the outflow pipe 50.

The threaded bush 150 is preferably screwed into the housing inner body 156 into abutment against the bottom region 160. The threaded bush 150 has, radially on the inside, an abutment face which faces the bottom region 160 and against which a jet controller 110 bears. Between the jet controller 110 and the bottom region 160 may be clamped a sealing ring 162. The sealing ring 162 forms a leaktight transition from the mixing water duct 158 to the threaded bush 150 having the jet controller 110 inserted in it, so that outflowing water cannot reach a radially outer side of the threaded bush 150 and of the outflow pipe 50.

In order to lead a multiwire electrical line 84 through the housing inner body 156 to the circuit board 76 having the light source 70 arranged on it, the housing inner body 156 has a line duct 164 which issues into the blind hole, into a region in which the holding ring 152 is arranged. The holding ring 152 has, adjacently to the line duct 164, a passage orifice 166 oriented in a radial direction, so that the electrical line 84 can be led through the line duct 164 and through the passage orifice 166. The electrical line 84 is connected electrically, on the one hand, to the circuit board 76 arranged in the holding ring 152 and, on the other hand, to the switch electronics which are controlled by a switching element 80.

As shown in FIG. 5, the switching element 80 is a generally known switching element for room lighting. By the switching element 80, a power supply to the switch electronics is switched on and switched off. As a result of the fairly slender type of construction, the switch electronics are preferably mounted in a box 170 below the washing table. The box 170 may have arranged in it, for example, a transformer, the power supply of which can be switched on or switched off by this switching element 80 and which supplies power to the switch electronics.

Many diverse possibilities are conceivable for switching on and switching off the light source 70, in any of the above-described or below-described structures. For example, both switch-on and switch-off may take place via a dimmer switch, so that the light intensity increases or decreases continuously.

Further, the light intensity can be adapted to the current light conditions in the room by a sensor.

In another embodiment, the switching element may be designed as a flow monitor which detects a water flow through at least one of the connecting lines 142, 142'. In the event of a water flow through the connecting lines 142, 142' and therefore through the sanitary fitting 10, the flow monitor activates the switch electronics in such a way that the light source is supplied with power when water flows out of the sanitary fitting 10.

Moreover, the light source may be switched off with a time delay, and/or the valve of the mixer cartridge 144 may be closed with a time delay.

In another embodiment, the switching element may be designed as an infrared detector, by which an electromagnetic valve of the sanitary fitting is activated in a known way. Moreover, the switching element designed as an infrared detector may be used for controlling the switch electronics, so that the light source 70 is supplied with power when water flows out.

Figure 7:
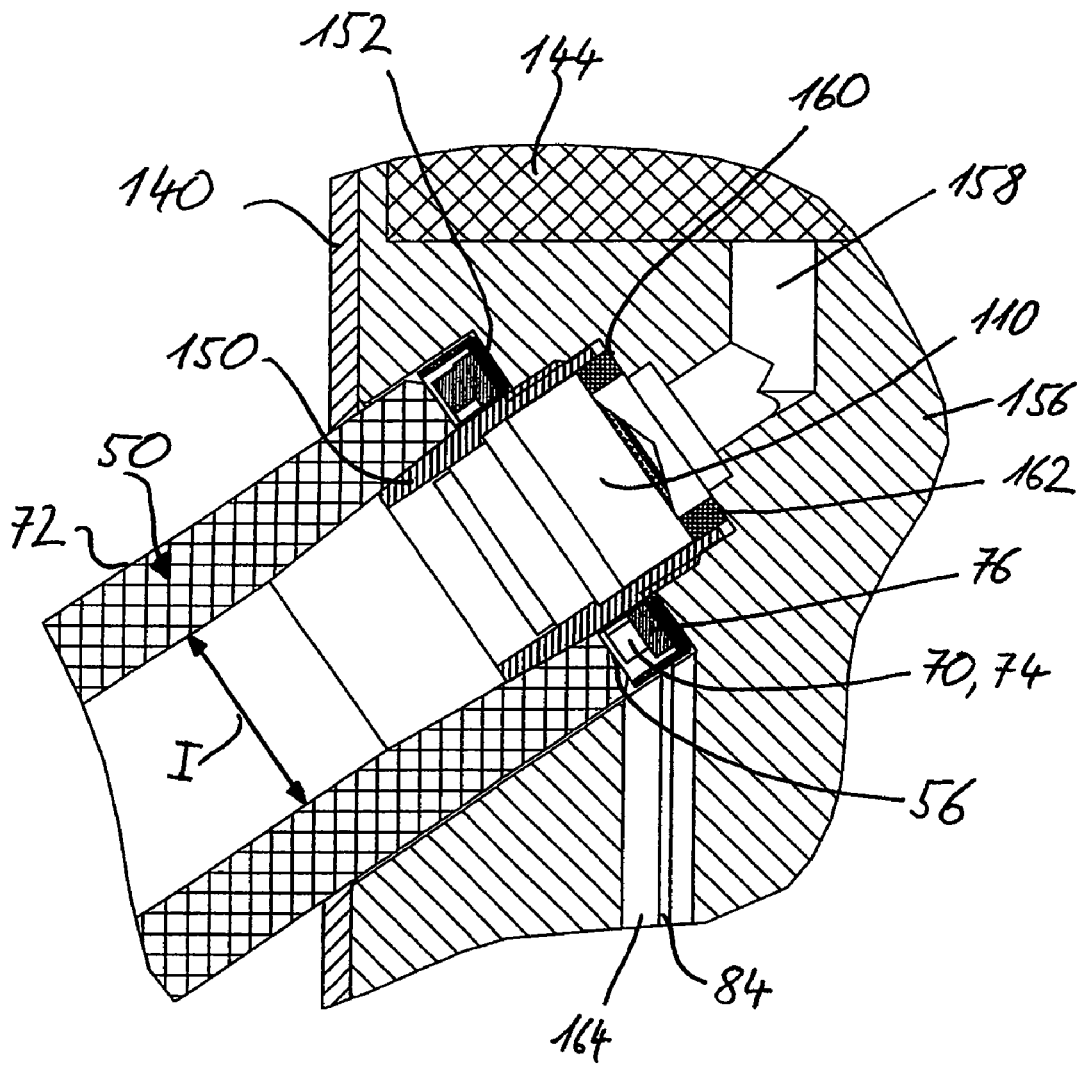
FIG. 7 shows a longitudinal section through part of a further embodiment of a lightguide outflow pipe.

Another exemplary embodiment is shown in FIG. 7. Only differences from the preceding exemplary embodiment are dealt with below, the same reference symbols being used for corresponding elements.

The outflow pipe 50 has, adjacently to the input face 56, a mounting region which lies partially outside the fitting housing 140. The inside diameter of the outflow pipe 50 widens conically from the inside diameter I outside the mounting region to an inside diameter at the input face 56. The threaded bush 150 has, at its end region inserted into the outflow pipe 50, an outer face fitting with an inner surface area of the mounting region of the outflow pipe 50 and is preferably glued into the outflow pipe 50.

The threaded bush 150 is screwed into the housing inner body 156 into abutment against the holding ring 152, so that the threaded bush 150 does not bear against the bottom region 160 of the blind hole.

In another embodiment, the switching element operatively connected to the actuation element 16 in such a way that the light source 70 is switched on when water flows out through the outflow pipe 50.

In another embodiment, the line duct 164 is filled with a filler, for example a two-component casting resin.

The sanitary fitting as shown in FIG. 1 can be equipped with a water outflow head 24 as shown in FIGS. 8 to 13. This water outflow head 24 may be fixedly connected to the extendable hose 26 running through the guide pipe 18, see FIGS. 1 to 3.

Figures 8, 9, 10:
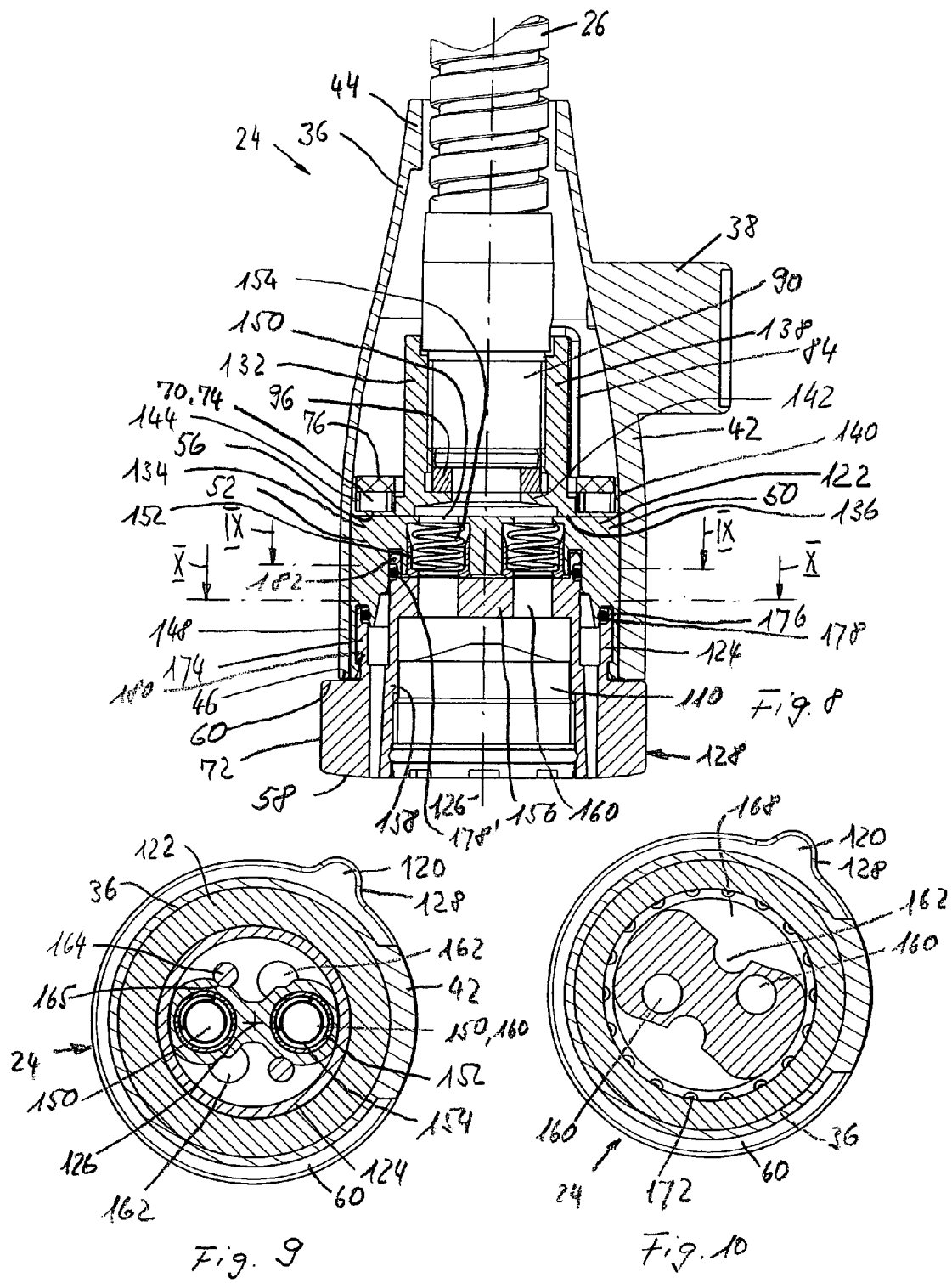
FIG. 8 shows, in the same view as FIGS. 2 and 3, a third embodiment of a water outflow head for a sanitary fitting as shown in FIG. 1 and having a switch-over element rotated in the first switching position.
FIG. 9 shows a cross section through the water outflow head shown in FIG. 8 along the intersection IX-IX of FIG. 8.
FIG. 10 shows a cross section through the water outflow head shown in FIG. 8 along the intersection X-X of FIG. 8.
Figure 11:
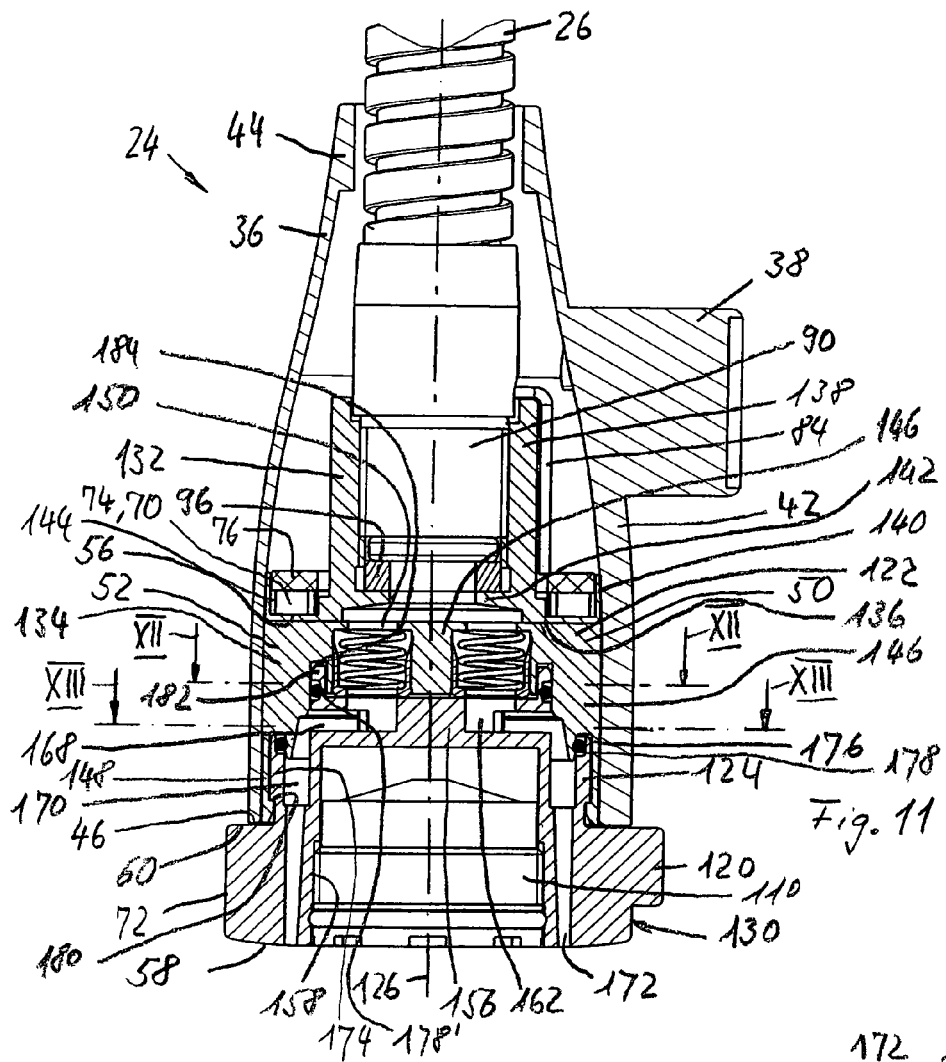
FIG. 11 shows, in the same view as FIG. 8, the shown embodiment of the water outflow head with the switch-over element being rotated into a second switching position.

As shown in FIGS. 8 to 11, the housing 36 of the water outflow head 24 has the bell-like shape which is adapted to the shape of the receptacle 22. In order to allow simple handling, the housing 36 also has the tenon-like pull-out aid 38 which projects in a radial direction. The housing 36 has further the bead 42 which, if the water outflow head 24 is inserted into the receptacle 22, engages together with the pull-out aid 38 into the guide slot 40. Apart from in the region of the bead 42 and in the end region 44 located upstream, the housing 36 has a thin-walled design with substantially constant wall thickness. At the end located downstream, apart from in the region of the bead 42, the housing 36 has the peripheral housing end face 46. The water outflow head 24 has a water-carrying, light-permeable light-guide outflow pipe 50 connected to the water hose 28, see FIGS. 2 and 3. The outflow pipe 50 is manufactured, for example, from acrylic glass or from another transparent or translucent material such as a polyamide, especially Grilamid®. The outflow pipe 50 has an essentially hollow-cylindrical light transmission region 52 in a portion located downstream. This light transmission region 52 is delimited, on the one hand, upstream, by the input face 56 and, on the other hand, downstream, by the exposed end face 58. The end face 58 lies opposite the input face 56 in the outflow direction, and both the end face 58 and the input face 56 may lie at right angles to the longitudinal axis of the outflow pipe 50. However, the end face 58 can be slightly convex as shown in FIGS. 8 and 11. A wall of the outflow pipe 50 makes the light transmission region 52.

The outflow pipe 50 may have spaced apart from the end face 58, the radially outer shoulder 60 which is oriented upstream. A small interspace is present between the outer shoulder 60 and the housing end face 46. Between the shoulder 60 and the end face 58, the outflow pipe 50 may radially protrude the housing 36 and there have the exposed outer surface area 72. The exposed outer surface area 72 may be exposed even with the water outflow head 24 inserted into the receptacle 22. Furthermore, the exposed outer surface area 72 may have a protrusion 120 and/or recesses for building a rotary handle.

Unlike the embodiments shown in FIGS. 1 to 3 with a one-piece outflow pipe 50 comprises the outflow pipe 50 of the embodiment according to FIGS. 8 to 13 a first outflow pipe piece 122 and a second outflow pipe piece 124. The first outflow pipe piece 122 is fixedly arranged in the housing 36 whereas the second outflow pipe piece 124 disposed downstream the first outflow pipe piece 122 is rotatable about the axis 126 from a first position 128 shown in FIGS. 8 to 10 into a second position 130 shown in FIGS. 11 to 13 and reverse.

The first outflow pipe piece 122 is made of an upstream component 132 and a downstream component 134; these two components 132 and 134 are fixed one to the other preferably by ultrasonic welding in the mutual contacting surface 136, preferably being in a plane oriented at right angles to the axis 126. Nevertheless, it is also possible to produce the first outflow pipe piece 122 integrally in one-piece.

The upstream component 132 comprises a central hollow zylindrical connecting portion 138 and a flange portion 140 radially protruding and surrounding the downstream end section of the connecting portion 138. The connecting portion 138 is provided with an inside thread in which the sleeve 90 is turned in. The sealing ring 96 is arranged between the front side of the sleeve 90 and a ring-like inner flange 142 of the upstream component 132.

The flange portion 140 has a circumferential groove 144 which is open at the upstream side of the flange portion 140 and whose bottom defines the input face 56. The annular circuit board 76 is inserted into the groove 144 whereby the light source 70 arranged at the circuit board 76 is directed towards the bottom and preferably bears directly against the input face 56.

The light source preferably comprises light emitting diodes (LED) 74 as described above in connection with FIG. 2. The electrical line 84 radially leaning the sleeve 90 as also shown in FIGS. 2 and 3 and described above leads to the circuit board 76.

The downstream component 134 is formed like a cup whereby a bottom wall forms a barrier 146 and the annular side wall 148 is firmly connected to the housing 36, for example by gluing. The upstream front side of the barrier 146 and the downstream front side of the flange portion 140 lie against each other thereby forming the annular mutual contacting surface 136 where these two components 132 and 134 are light-transmissionally fixed to one another.

The barrier 146 comprises two water passages 150 arranged diametrically and eccentrically with respect to the axis 126 and being in flow connection with the hose 26. A sealing sleeve 152 is inserted into each of the two water passages 150. Each sealing sleeve 152 circumferentially resting slidably against the water passage 150 is held by means of a compression spring 154 in abutment against the second outflow pipe piece 124.

The free end of the annular side wall 148 of the downstream component 134, and hence of the first outflow pipe piece 132, is in alignment with the end face 46 of the housing 36.

The second outflow pipe piece 124 is also formed like a cup and inserted, with a bottom wall-section 156 in front into the first outflow pipe piece 122. An annular wall-section 158 of the second outflow pipe piece 124 is in the free end section distant from the bottom wall-section 156 formed with a larger wall thickness thereby providing the outer shoulder 60 and the exposed outer surface area 72.

Figure 13:
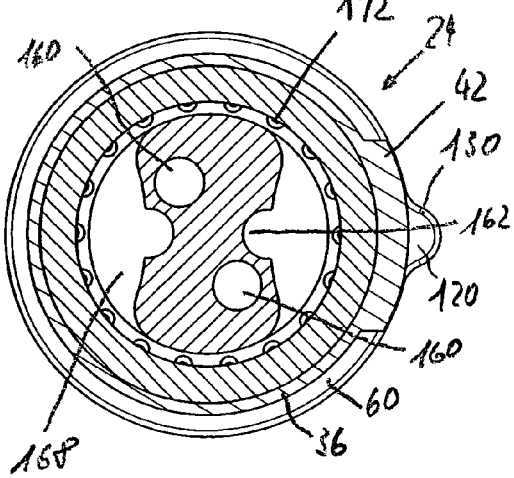
FIG. 13 shows a cross section through the water outflow head shown in FIG. 11 along the intersection XIII-XIII of FIG. 11.

The bottom wall-section 156 comprises two first apertures 160 as shown in FIGS. 8 and 10 as well as two second apertures 162 displaced in FIGS. 11 and 13.

The first apertures 160 run in a direction parallel to the axis 126 through the bottom wall-section 156 and open out into a central outflow space of the second outflow pipe piece 124, in which the jet controller 110 is arranged. In the first position 128 of the second outflow pipe piece the first apertures 160 connect the water passages 150 and thus the hose 26 with the jet controller 110 so that the water only flows out the water outflow head 24 through the jet controller 110 which produces a soft water jet. In the first position 128 the second apertures 162 are turned away from and thus are not connect to the water passages 150 so that no water flows into the second apertures 162.

As shown in FIG. 9, the water passages 150, the first apertures 160 and the second apertures 162 are eccentrically arranged with respect to the axis 126 at an equal distance to this axis 126. The diametrically arranged two second apertures 162 are displaced with respect to the also diametrically arranged two first apertures 160 about 60° in the counter-clockwise directions.

Figure 12:
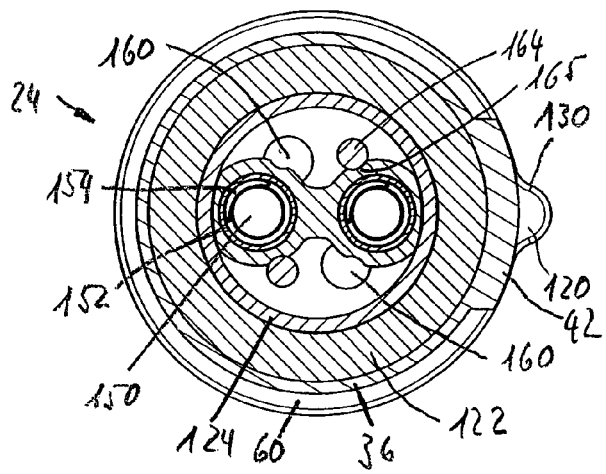
FIG. 12 shows a cross section through the water outflow head shown in FIG. 11 along the intersection XII-XII of FIG. 11.

By turning the second outflow pipe piece 124 for 60° in the clockwise direction into the second position 130 the second apertures 162 come into flow connection with the water passages 150 whereas the first apertures 160 disconnect from the water passages 150 as illustrated in FIG. 12.

A limitation of the rotary motion of the second outflow pipe piece 124 is accomplished by means of two diametrically arranged stubs 164 of the second outflow pipe piece 124 cooperating with respective stops 165 of the first outflow pipe pieces 122.

The second apertures 162 are designed, shown in the outflow direction of the water, as blind holes whereby a radial passage 168 leads in the bottom wall-section 156 from the bottom zone of each of the second apertures 162 to the radial outer end of the second outflow pipe piece 124.

The wall-section 158 comprises a circular groove 170 open in upstream direction and in persuant connection with the two radial passages 168. A plurality of nozzles 172 run from the bottom of the circular groove 170 to the end face 58. The direction of the nozzles 172 is essentially parallel to the axis 126 and the nozzles 172, which can be coated with elastic material, are arranged on a circle surrounding the central outflow space with the jet controller 100 equally spaced one behind the other in the circumferential direction. Thus, in the second position 130 of the second outflow pipe piece 124 water solely flows out the water outflow head 24 through the nozzles 172 that produce "strong" water jets.

Between the radial outer end of the second outflow pipe piece 124 where the radial passages 168 discharge and a radial outer collar 174 of the wall-section 158 the flow path for the water to the circular groove 170 is delimited by the first outflow pipe piece 122. The radial outer collar 174 defining the circular groove 170 of the radial outer side engages with a free end portion an annular sealing groove 176 of the first outflow pipe piece 122 where a first x-ring 178—or a quadring—is arranged in a circumferential groove of the radial outer collar 174 to seal between the first and second outflow pipe pieces 122, 124. Furthermore, the radial outer collar 174 engages an undercut 180 of the first outflow pipe piece 122 for a pivotable but in the direction of the axis 126 fixed bearing of the second outflow pipe piece 124 in the first outflow pipe piece 122.

A circular sealing collar 182 protrudes from the bottom wall section 158 of the second outflow pipe piece 124 and engages a respective further sealing groove 184 in the barrier 146. This further sealing groove 184 encompasses the water passages 150. A second O-ring 178' is there arranged in a circumferential groove of the sealing collar 182 to also seal between the first and second outflow pipe pieces 122, 124. Thus, leak of water between the first and second outflow pipe pieces 122, 124 to the environment and from the water passages 150 into the circular groove 170—if the second outflow pipe piece is turned into the first position 128—is prevented.

The light emitted by the light source 70 enters the first outflow pipe piece 122 at the input face. It is led by the light-permeable first outflow pipe piece 122 to the pivotable second outflow pipe piece 124. This also light-permeable second outflow pipe piece 124 leads the light to the end face 58 and the exposed outer surface area 72 where it emerges. The first and second outflow pipe pieces 122, 124 are designed such that a light guiding cross section as large as possible and as free of obstruction as possible is obtained.

For the rest, the water outflow head 24 as disclosed in connection with FIGS. 8 to 13 can have the features as shown and described further above in connection with FIGS. 1 to 7.

The angle of the rotary motion of the second outflow pipe piece 124 can be different from 60°, for example 90°. The design of the first and second outflow pipe pieces 122, 124 can easily be adapted.

While the invention has been described in conjunction with specific embodiments, these embodiments should be viewed as illustrative and not limiting. Various changes, substitutes, improvements or the like are possible within the spirit and scope of the invention.

What is claimed is:

1. A sanitary fitting comprising:
 a light-permeable water-carrying outflow pipe that has (i) an exposed end face and (ii) an input face located upstream of the exposed end face;
 a light source, the light of the light source is input into a wall of the light-permeable water-carrying outflow pipe at the input face, the light of the light source is guided in the wall, and emerges at the exposed end face,
 wherein the light permeable water-carrying outflow pipe comprises a first outflow pipe piece having the input face and a second outflow pipe piece having the exposed end face,
 the second outflow pipe piece is movable relative to the first outflow pipe piece from a first position into a second position and vice versa.

2. The sanitary fitting as claimed in claim 1, wherein the first outflow pipe piece has a barrier and a water passage, the second outflow pipe piece has a first aperture and a second aperture, in the first position of the second outflow pipe piece the first aperture communicates with the water passage and in the second position of the second outflow pipe piece the second aperture communicates with the water passage.

3. The sanitary fitting as claimed in claim 1, wherein the input face lies opposite the exposed end face.

4. The sanitary fitting as claimed in claim 1, wherein the light source has one or more light emitting diodes (LED).

5. The sanitary fitting as claimed in claim 1, wherein the light-permeable water-carrying outflow pipe and the light source are built into a water outflow head.

6. The sanitary fitting as claimed in claim 1, wherein light is output from an outer peripheral surface area of the second outflow pipe piece.

7. The sanitary fitting as claimed in claim 2, wherein the input face lies opposite the exposed end face.

8. The sanitary fitting as claimed in claim 2, wherein the light source has one or more light emitting diodes (LED).

9. The sanitary fitting as claimed in claim 2, wherein the light-permeable water-carrying outflow pipe and the light source are built into a water outflow head.

10. The sanitary fitting as claimed in claim 5, further comprising (i) a fitting housing and (ii) a guide pipe which projects from the fitting housing and which has, in a free end region, a receptacle for the water outflow head.

11. The sanitary fitting as claimed in claim 10, wherein an extendable hose connected to the water outflow head runs in the guide pipe, the extendable hose having a water hose and an electrical line in order to supply water and power to the water outflow head.

12. The sanitary fitting as claimed in claim 11, wherein the water outflow head, together with the extendable hose, can be pulled out of the receptacle and can be inserted into the receptacle again.

13. The sanitary fitting as claimed in claim 1, wherein the light source is disposed against the input face.

14. The sanitary fitting as claimed in claim 11, further comprising a switching element, the switching element being arranged on a water outflow head.

15. The sanitary fitting as claimed in claim 4, wherein the light emitting diodes (LED) are designed as a surface mountable component.

16. The sanitary fitting as claimed in claim 8, wherein the light emitting diodes (LED) are designed as a surface mountable component.

* * * * *